United States Patent
Ezell et al.

(10) Patent No.: US 8,644,817 B1
(45) Date of Patent: Feb. 4, 2014

(54) SYSTEM AND METHOD FOR PRESENTING A SINGLE PERSISTENT VIEW OF A MULTI-MODULE COMMUNICATION DEVICE TO A NETWORK

(71) Applicant: Avaya Inc., Basking Ridge, NJ (US)

(72) Inventors: Joel M. Ezell, Broomfield, CO (US); Jason Tanabe, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/627,750

(22) Filed: Sep. 26, 2012

(51) Int. Cl.
- *H04W 4/00* (2009.01)
- *H04W 36/00* (2009.01)
- *H04M 1/00* (2006.01)

(52) U.S. Cl.
USPC .............. 455/426.1; 455/436; 455/552.1; 370/331; 370/338

(58) Field of Classification Search
USPC ............ 455/426.1, 448, 435.1–444, 552.1; 370/331, 338
See application file for complete search history.

(56) References Cited

U.S. PATENT DOCUMENTS

| | | | |
|---|---|---|---|
| 7,486,949 B2 | 2/2009 | Ignatin | |
| 2005/0282541 A1* | 12/2005 | Iizuka et al. | 455/426.2 |
| 2006/0089169 A1* | 4/2006 | Tsao et al. | 455/552.1 |
| 2007/0140157 A1* | 6/2007 | Fu et al. | 370/318 |
| 2008/0084859 A1 | 4/2008 | Sullivan | |
| 2009/0003316 A1* | 1/2009 | Lee et al. | 370/352 |
| 2009/0111472 A1* | 4/2009 | Promenzio et al. | 455/439 |
| 2010/0105379 A1 | 4/2010 | Bonner et al. | |
| 2011/0289203 A1 | 11/2011 | Braudes et al. | |
| 2011/0289219 A1 | 11/2011 | Braudes et al. | |

* cited by examiner

*Primary Examiner* — Vladimir Magloire
*Assistant Examiner* — Michael Mapa
(74) *Attorney, Agent, or Firm* — Sheridan Ross P.C.

(57) ABSTRACT

An endpoint adaptor and methods of operating the same are provided. The endpoint adaptor provides a single persistent view of a mobile communication device to a network and network-based applications. Moreover, a mobile application on the communication device can leverage the full capabilities of the device without passing any of the complexities associated therewith beyond a network agent acting on behalf of the mobile application.

20 Claims, 3 Drawing Sheets

SYSTEM AND METHOD FOR PRESENTING A SINGLE PERSISTENT VIEW OF A MULTI-MODULE COMMUNICATION DEVICE TO A NETWORK

FIELD OF THE DISCLOSURE

The present disclosure is generally directed toward communications and more specifically directed toward mobile communications.

BACKGROUND

Today's mobile communication devices support the ability to utilize many different network technologies (e.g. Wi-Fi, Cellular, Wired Ethernet, Bluetooth, etc.). In most cases, these technologies are provided by independent and unrelated service providers and the identity of the device on each network is represented differently. In the case of cellular voice, the device representation is a cellular phone number rather than an enterprise SIP Address of Record (AOR). This creates a problem for real-time communications applications that utilize media sessions. When the underlying network utilized/supported on the device changes from one network to another, the identity representing the device changes. Needless to say, this presents many obstacles, most of which have not been solved by a single solution to date. Often times, the network will change without providing the user with the ability to influence the change. If network connectivity is lost during an audio call, for example, the result is often that the call is terminated.

SUMMARY

It is with respect to the above issues and other problems that the embodiments presented herein were contemplated. In particular, embodiments of the present disclosure propose an endpoint adapter to represent a remote application operating on a mobile communication device. The remote application and the endpoint adapted can be configured to act in concert such that: (1) native protocols can be used by the mobile application to leverage the full capabilities of the mobile communication device and the full capabilities of the network where the endpoint adapter resides and (2) The endpoint adapter can provide the rest of the network a single persistent view of the mobile application even in cases where the mobile application is moving from one network to another (e.g., a first IP network to a second IP network, the Public Switched Telephone Network (PSTN) to an IP network, an IP network to the PSTN, or has no IP connectivity at all.

In some embodiments, the endpoint adapter is designed to present a persistent registration and network presence to a network core (e.g., an enterprise communication network) for a single Session Initiation Protocol (SIP) contact. Specifically, the endpoint adapter can be configured to register a single SIP contact that represents both "heads" of a multi-module communication device, where each module in the multiple modules supports communications via different protocols and different networks (e.g., cellular, Wi-Fi, and mobile data such as LTE, 4G, 3G, etc.). In some embodiments, the registration appears as a single device/entity to the network core. This sets up a combined mobile identity. The endpoint adapter can, therefore, be configured to ensure that the appropriate signaling mechanism (e.g., module on the communication device) is alerted based on policies for the registration.

In some embodiments, a mobile communication device comprises a first communication module and a second communication module. The first communication module may correspond to a SIP client and the second communication module may correspond to a module that enables cellular communications via a cellular communication network. In some embodiments, the first communication module may register with the endpoint adapter via a first communication network and the second communication module may register with the endpoint adapter via a second communication network. Moreover, the SIP client may further be configured to register with the endpoint adapter rather than a session manager or communication server residing on the enterprise network as is traditionally required for the SIP client. Registration of the first and second communication modules enables the endpoint adapter to present the combined mobile identity to be presented to the rest of the network.

In some embodiments, the communication module(s) may not be required to actively register with the endpoint adapter. For instance, a standard PSTN communication module may be assumed to always be accessible via the mobile phone number. This means that the PSTN communication module would not have to actively register with the endpoint adapter to be available to the endpoint adapter.

In some embodiments, the endpoint adapter may be configured to alter its behavior based on whether or not the SIP client was registered. In any event, the endpoint adapter may still be configured to present a consistent set of capabilities to the network regardless of whether or not the SIP client was registered.

It is one aspect of the present disclosure to provide the ability to anchor calls for a mobile communication device with a communication network backend, such as an enterprise network core. In some embodiments, anchoring may be performed on behalf of the adapted endpoint (e.g., the mobile communication device) but it also benefits the servers in the network core as it makes handoffs transparent. The anchoring may be performed with or without a media server. If anchored without a media server, the endpoint adapter would be configured to re-INVITE the core with updated Session Description Protocol (SDP) information representing the new backend address. This would likely only be done if the mobile communication device itself participates in the dual mode handoff as it will take some time to establish the new session on the alternate network. On the other hand, if the call is anchored with a media server, no re-INVITE would be required for the core as the SDP would remain constant (e.g., it would be that of the media server) and the media server could ask the far-end to be patient as a handoff is in progress.

Some non-limiting examples of a handoff scenario that may benefit from the functionality of the endpoint adapter include: (1) when a user moves from a cellular/PSTN voice call into an area where he or she would switch over to SIP over Wi-Fi, the endpoint adapter seamlessly provides a handoff between the two networks and/or (2) when a user driving under a bridge loses the signal, the endpoint adapter could send a prompt to the far end (e.g., the mobile communication device) with a message, "Please wait while your call reconnects." When the user emerges on the other side of the bridge, the call resumes. The far end is given specific instructions so that he or she doesn't terminate the call.

In accordance with at least some embodiments of the present disclosure, a method is provided which generally comprises:

enabling a first communication module of a communication device to communicate with an endpoint adapter, the first communication module communicating with the endpoint adapter via a first communication network that uses a first address to contact the communication device;

enabling a second communication module of the communication device to communicate with the endpoint adapter, the second communication module communicating with the endpoint adapter via a second communication network that uses a second address to contact the communication device; and causing the endpoint adapter to present the first and second communication modules as a single communication device to a third communication network.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
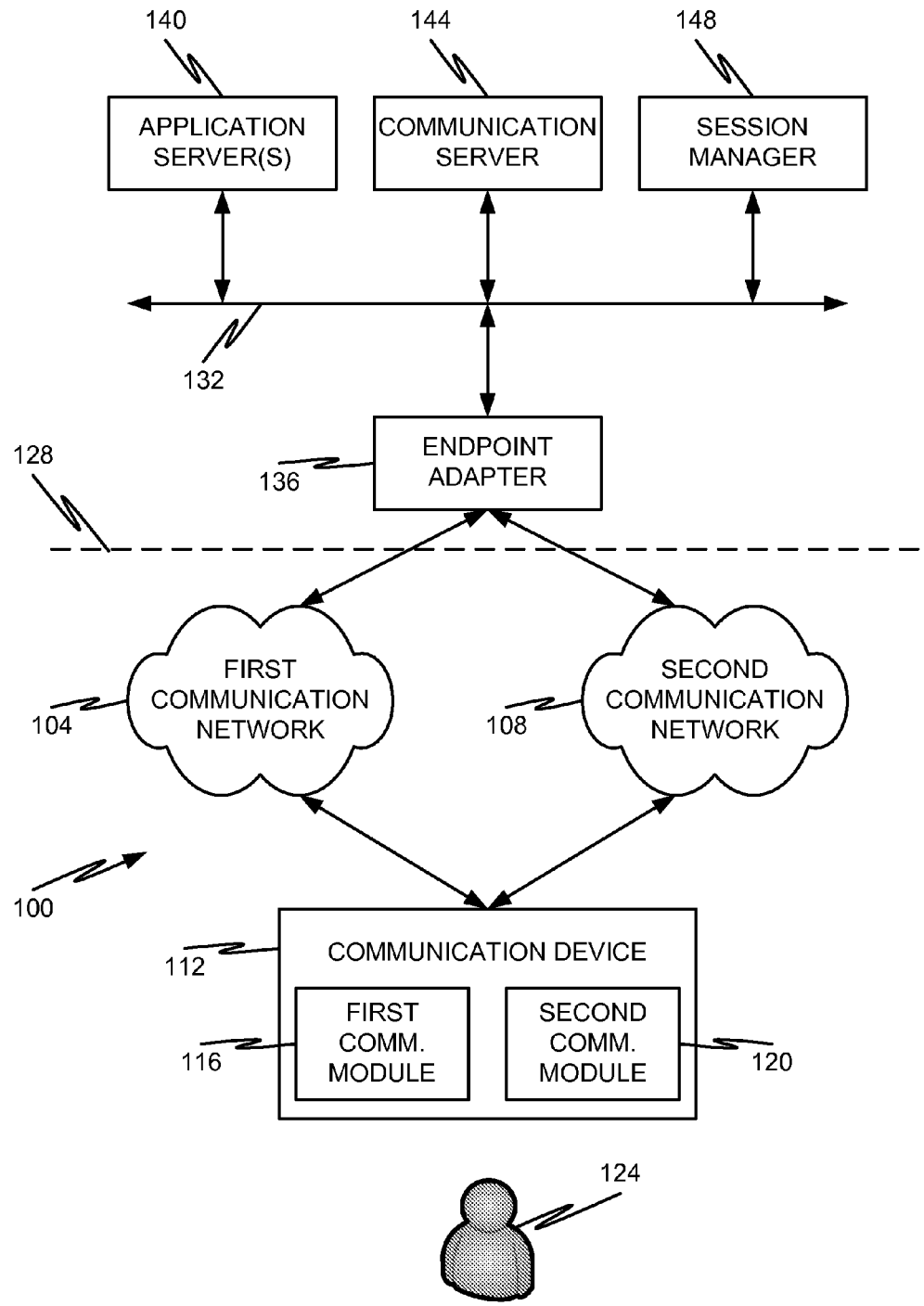
FIG. 1 is a block diagram of a communication system in accordance with embodiments of the present disclosure.

FIG. 1 shows an illustrative embodiment of an illustrative communication system 100 in accordance with at least some embodiments of the present disclosure. The communication system 100, as depicted, includes a first communication network 104, a second communication network 108, a communication device 112 having a first communication module 116 and a second communication module 120, and a third communication network 132 that includes an endpoint adapter 136, one or more application servers 140, a communication server 144, and a session manager 148.

The communication device 112, in some embodiments, corresponds to a mobile communication device such as a cellular phone, smart phone, laptop, tablet, Personal Digital Assistant (PDA), or combinations thereof. Moreover, the communication device 112 may include any collection of components that enable the user 124 to exchange media (e.g., voice, video, etc.), data (e.g., emails, Short Message Service (SMS) messages, Multimedia Message Service (MMS) messages, files, presentations, documents, etc.) with other communication devices. The communication device 112 may be configured to be carried and used by a user 124 to have communication sessions with other users via their respective communication devices, which can be provided within or external to the third communication network 132.

In some embodiments, the third communication network 132 is separated from the first and second communication networks 104, 108 by a network boundary 128. The network boundary 128 may correspond to a logical or physical separation between the networks. In some embodiments, the network boundary 128 may be established by one or more devices that insulate the networks from one another. Even more specifically, a network boundary device (e.g., firewall, Session Border Controller (SBC), gateway, Network Address Translator (NAT), or the like) may be provided to establish and maintain the network boundary 128.

More specifically, the network boundary 128 may be needed because the third communication network 132 may be administered by a particular entity or enterprise that has specific communication rules, policies, etc. that are enforced within the third communication network 132. One or more system administrators for the entity may be employed to enforce and maintain the communication rules, policies, etc. within the third communication network 132. As such, the third communication network 132 may be considered a "trusted" network whereas the first and second communication networks 104, 108 may be public or "untrusted" networks.

Even more specific examples of the third communication network 132 may include an enterprise communication network such as a Local Area Network (LAN), a Wide Area Network (WAN), a SIP network, a Voice over IP (VoIP) network, or the like. Often times, the third communication network 132 employs one or more protocols that are specific to that network (e.g., not used by the first or second communication networks 104, 108).

It should be noted that the third communication network 132 may be the same as the second communication network 108 in some scenarios. For example, if the second communication module 120 is communicating using enterprise Wi-Fi, the second communication network 108 and third communication network 132 may be a single network.

In some embodiments, the endpoint adapter 136 is provided to present a single persistent view of the communication device 112 to the third communication network 132 and more specifically the devices operating in the third communication network 132.

In some embodiments, the third communication network 132 may be capable of providing rich communication features and functions to communication devices inside the network 132 as well as communication devices outside the network 132 (e.g., the communication device 112). Examples of the types of rich communication features that may be provided by the third communication network 132 include, without limitation, presence features, extension-to-cellular features, enhanced media features, advanced call routing features, conferencing features, call recording features, security features (e.g., encryption), collaboration features, voicemail, media conversion features (e.g., text-to-speech, speech-to-text, etc.), combinations thereof, and the like.

These rich communication features provided by the third communication network 132 may be provided by the concerted efforts of the application server(s) 140, communication server 144, and/or session manager 148. In some embodiments, the application server(s) 140 may correspond to one or more of a Back-to-Back User Agent (B2BUA) or proxy server that is configured to be included in a communication session for or on behalf of a user by the session manager 148. Specifically, multiple session managers 148 may be provided in the third communication network 132.

Upon receiving the call-initiating message, the session manager 148 may refer to communication preferences for the calling/called user and may sequence one or more application servers 140 into the communication session so that the application server(s) 140 can provide rich communication features to the user during or after the communication session. In some embodiments, the session manager 148 may include the selected application server(s) in the signaling path and/or media path to enable the application server(s) 140 to have access to the communication session and data exchanged during the session such that the application server(s) 140 can influence or act on the communication session.

Additional details of possible behaviors and rich communication features that may be provided by the third communication network 132 are described in U.S. Patent Publication Nos. 2011/0289219 and 2011/0289203, each of which are hereby incorporated herein by reference.

As noted above, the endpoint adapter 136 may be configured to simultaneously maintain contact information for the first communication module 116 and second communication module 120 of the communication device 112. The contact information for the communication modules 116, 120 may be obtained via registration (e.g., the modules 116, 120 may actively register with the endpoint adapter 136 either automatically or manually), via configuration (e.g., administrator provisioning, user provisioning, default static settings, etc.), or via any other known mechanisms. In some embodiments, the first communication module 116 may be contacted by the endpoint adapter 136 using a first address or addressing schema and the second communication module 120 may be contact by the endpoint adapter 136 using a second address or addressing schema that is different from the first address or addressing schema.

More specifically, the address or addressing schema used by the communication modules may depend upon the nature of the communication network with which the endpoint adapter 136 connects with the communication module. As some non-limiting examples, the first communication network 104 may correspond to a PSTN, cellular, or similar type of network whereas the second communication network 108 may correspond to a data network (e.g., SIP network, IP network, VoIP network, mobile data network, LTE, 3G, 4G, etc.). Continuing the above example, the first communication module 116 may be contacted by the endpoint adapter 136 using a phone number or any other addressing schema supported by the first communication network whereas the second communication module 120 may be contacted by the endpoint adapter 136 using an IP address, SIP address, user ID/user name (e.g., JINGLE ID, Skype ID, etc.) or any other addressing schema supported by the second communication network.

Still continuing the above example, the second communication module 120, since it is using a data network, may correspond to a SIP endpoint, SIP User Agent (UA), VoIP application (e.g., Skype, Jingle, etc.) and/or a thin client browser operating on the communication device 112. Where the second communication module 120 corresponds to a thin client browser, the endpoint adapter 136 may be further equipped with an Hyper Text Markup Language (HTML) extension or module that enables the endpoint adapter 136 to present one or more html-type files (e.g., webpages pages or other information that can be displayed in a web browser). The browser on the communication device 112 may use an IP address and that IP address may correspond to the IP address provided to the endpoint adapter 136 for registration. Where the second communication module 120 corresponds to a SIP endpoint or SIP UA, the second communication module 120 may register with or be contacted by the endpoint adapter 136 using a SIP address or the like.

The first communication module 116, on the other hand, may be contacted by the endpoint adapter 136 using the phone number or the like. The first communication module 116 enables the communication device 112 to exchange messages with the endpoint adapter 136 via the first communication network 104 whereas the second communication module 120 enables the communication device 112 to exchange messages with the endpoint adapter 136 via the second communication network 108.

Because the endpoint adapter 136 has two possible communication paths to the communication device 112, the endpoint adapter 136 is enabled to insulate the third communication network 132 from outages of either the first communication network 104 or the second communication network 108 when the communication device 112 is involved in a communication session that employs one or more components of the third communication network 132. Thus, if connectivity between the endpoint adapter 136 and the communication device 112 is lost over one network (e.g., the first communication network 104), the endpoint adapter 136 can use the connection over the other network (e.g., the second communication network 108).

Furthermore, the endpoint adapter 136 is allowed to communicate with both sides/modules of the communication device 112 via two different networks, but presents a single view of the device 112 to the third communication network 132. This is possible because both modules 116, 120 of the communication device 112 are allowed to persistently and simultaneously register or communicate with the endpoint adapter 136. Availability of multiple networks helps in handoff scenarios because the endpoint adapter 136 can see a network loss and extend an in-progress call through the other network. While there may be a temporary loss of media during the handoff, the call is maintained and there is no requirement to re-establish the entire application sequence or dialog that was established prior to the network loss. This means that the user 124 of the communication device 112 may experience a temporary loss in media during the handoff, but they will not be required to re-dial to re-establish the communication session that existed before the network loss.

It should be appreciated that the endpoint adapter 136 also enables interesting features other than call preservation during mid-call network failures. Specifically, the endpoint adapter 136 provides the third network 132 with a single target address when they wish to initiate a conversation or dialog with the communication device 112. A potential use case that leverages this features is a "make call" attempt. As an example, a caller could, through some central application such as a corporate directory, indicate that they want to initiate a call to the selected user 124 using their mobile phone. The core application would then send an Out of Dialog REFER to the endpoint adapter 136, which then selects the appropriate backend interface to use to actually initiate the call to the user 124. If a PSTN network is selected, for example, then it would be a "call-me/call-you" style call initiation where other applications 140 may need to be invoked. If, on the other hand, the endpoint adapter 136 selects a data or SIP network, then the endpoint adapter 136 could pass the REFER along to the SIP UA (e.g., second communication module 120) on the communication device 112 to have a "directionally correct" make call. Another possible use case would be initiating a text message or Instant Message rather than a voice call.

Figure 2:
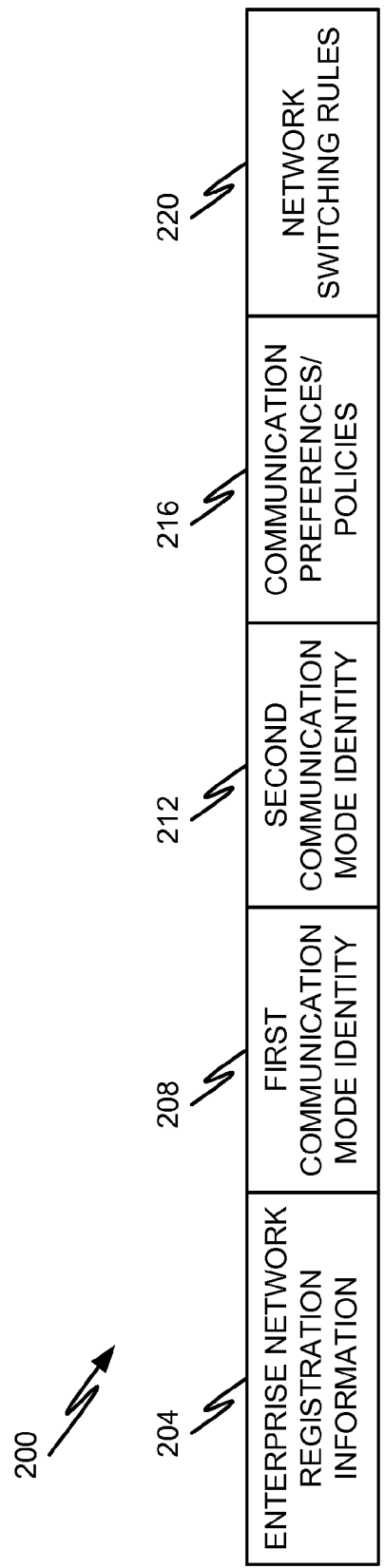
FIG. 2 is a block diagram a data structure used in accordance with embodiments of the present disclosure.

While embodiments of the communication system 100 have been described in connection with a certain number and type of devices and servers, it should be appreciated that embodiments of the present disclosure are not so limited. In particular, any of the components or devices With reference now to FIG. 2, an illustrative data structure 200 used in accordance with at least some embodiments of the present disclosure will be described. The data structure 200 may comprise a plurality of data fields to support functions of the endpoint adapter 136 and other devices described herein. It should be appreciated that some or all of the data structure 200 may be maintained in the endpoint adapter 136 or made accessible to the endpoint adapter 136. Of course, other components in the system 100 may have or have access to some or all of the data fields in the data structure 200. Accordingly, the data structure 200 does not necessarily need to be stored in a single location as a unitary block of data, but rather can be distributed amongst a plurality of different devices and/or components. Non-limiting examples of the data fields that may be included in the data structure 200 include an enterprise network registration information field 204, a first communication mode identity field 208, a second communication mode identity field 212, a communication preferences/policies field 216, and a network switching rules field 220.

The enterprise network registration information field 204 may be used to store information that is used by the endpoint adapter 136 to present the communication device 112 to the third communication network 132. More specifically, the enterprise network registration information field 204 may comprise a single SIP contact (e.g., alias, email address, user name, or the like) that is used within the enterprise network 132 and devices contained therein to refer to the user 124 and/or the user's identity (e.g., SIP identity) within the network 132.

The first communication mode identity field 208 may comprise information used by the endpoint adapter 136 to target the first communication module 116. More specifically, the first communication mode identity field 208 may comprise information that describes addressing information for the first communication module 116 via the first communication network 104. As a non-limiting example, the first communication mode identity field 208 may store information used by the first communication module 116 to communicate with the endpoint adapter 136 (e.g., phone number).

The second communication mode identity field 212 may comprise information used by the endpoint adapter 136 to target the second communication module 120. More specifically, the second communication mode identity field 212 may comprise information that describes addressing information for the second communication module 120 via the second communication network 108. As a non-limiting example, the second communication mode identity field 212 may store information used by the second communication module 120 to communicate with the endpoint adapter 136 (e.g., SIP address, IP address, VoIP network username, alias, etc.).

The communication preference/policies information field 216 may comprise information regarding a user's 124 communication preferences and/or communication policies assigned to a user 124 either by default or from a network 132 administrator. In some embodiments, the communication preferences/policies 216 may include preferences for application server(s) 140 that are desired when the user 124 initiates and/or receives a call. The communication preferences/policies 216 may also include information that describes a user's 124 communication preferences with respect to their communication device 112 (e.g., whether the first or second communication module 116, 120 should be used if both networks 104, 108 are available. Any information which defines preferences or features desired by or for a user 124 may be maintained in the communication preference/policies information field 216.

The network switching rules field 220 may comprise information that describes rules or processes to be invoked by the endpoint adapter 136 if one of the communication networks 104, 108 fails or connectivity between the endpoint adapter 136 and communication device 112 is lost. Specifically, the network switching rules 220 may define how the endpoint adapter 136 should behave during handoff scenarios and what information should be presented to the network 132 during such a situation. The network switching rules 220 may also define whether the endpoint adapter 136 should proactively prompt the communication device 112 during reconnection or handoff scenarios.

Figure 3:
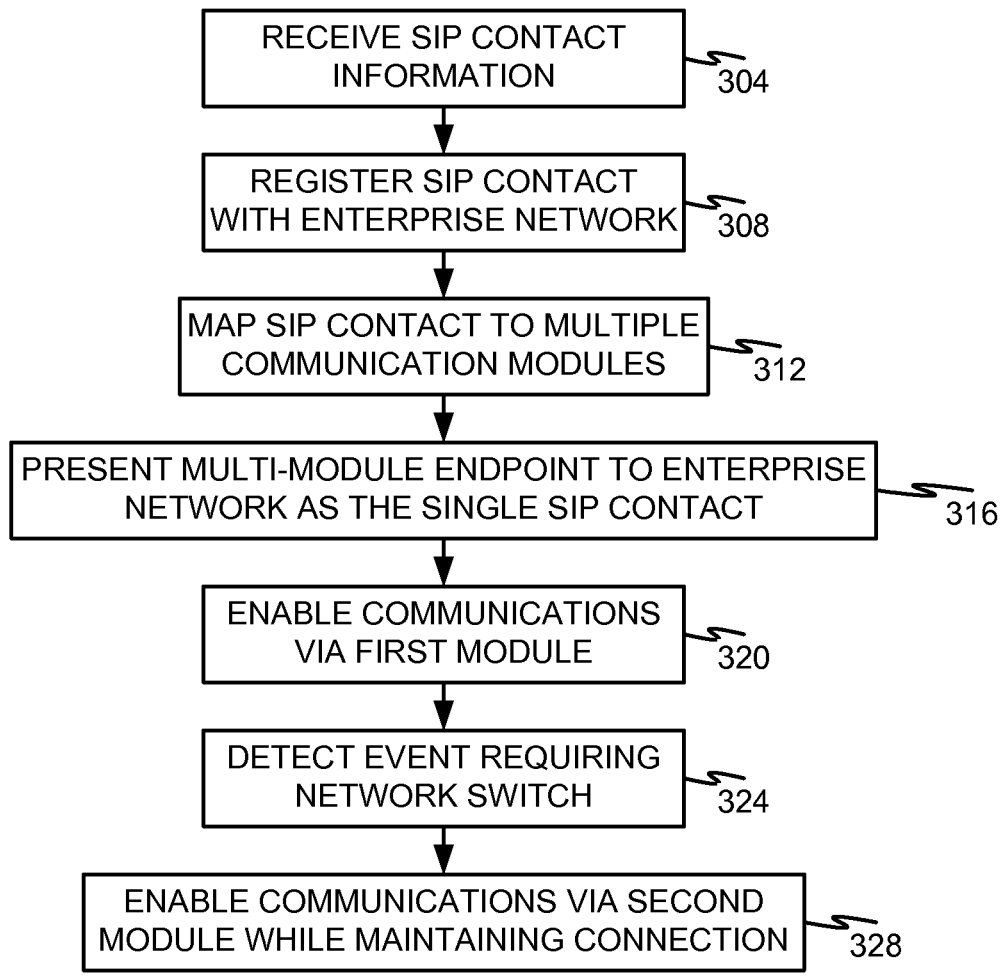
FIG. 3 is a flow diagram depicting a communication method in accordance with embodiments of the present disclosure.

With reference now to FIG. 3, an illustrative communication method will be described in accordance with embodiments of the present disclosure. The method is initiated when SIP contact information is received for a user 124 or the user's 124 communication device 112 at the endpoint adapter 136

(step 304). The SIP contact information may correspond to an AOR, a SIP identity or alias, or any other information used to refer to the user 124 within the third communication network 132.

The method continues with the registration of the SIP contact information within the third communication network 132 (e.g., an enterprise communication network) (step 308). In some embodiments, the registration of the SIP contact information may include the communication server 144 and/or session manager 148 updating one or more internally-maintained data structures or tables indicating that the user 124 has registered with the network 132 and is available to send/receive calls. Furthermore, registration of the SIP contact information allows the communication server 144 and/or session manager 148 to invoke the desired application server(s) 140 for the user 124 in the event that the user 124 receives or initiates a call with their communication device 112.

The method continues with the endpoint adapter 136 mapping the SIP contact to multiple communication modules 116, 120 (step 312). Although only two communication modules 116, 120 are depicted in FIG. 1, it should be appreciated that this mapping step may involve the endpoint adapter 136 mapping the SIP contact to two, three, four, or more communication modules within the communication device 112. The number of communication modules that are mapped to the SIP contact is generally only limited by the number of modules that are resident on the communication device 112.

In some embodiments, mapping the multiple communication modules 116, 120 to the single SIP contact enables the endpoint adapter 136 to present the multi-module communication device 112 to the enterprise network 132 as a single device (e.g., as the single SIP contact) (step 316). Even though the multiple communication modules 116, 120 have registered with the endpoint adapter 136, it may only be necessary to use one of the communication modules to facilitate communications between the communication device 112 and the rest of the network 132. Accordingly, the endpoint adapter 136 and/or the communication device 112 may select which of the modules will be used as a default module. The module used to initially facilitate communications may alternatively or additionally correspond to the only available module or may be defined by the communication preferences/policies information field 216.

In some embodiments, the endpoint adapter 136 communicates with the first communication module 116 of the communication device 112 via the first communication network 104 (step 320) until one or more events are detected that require the endpoint adapter 136 to switch to the second communication module 120 (step 324). The handover from the first communication network 104 to the second communication network 108 may occur automatically (e.g., in response to detecting a predetermined event or series of events) or manually (e.g., in response to the user 124 actively instructing their communication device 112 to switch networks).

After the network-switching event has been detected, the endpoint adapter 136 may begin communicating with the second communication module 120 of the communication device 112 via the second communication network 108 (step 328). The second communication module 120 may continue to be used until: (1) the connection with the first communication module 116 is restored with the endpoint adapter 136, (2) the connection with the second communication module 120 suffers, deteriorates, or is lost, and/or (3) the network switching rules 220 dictate that the communication session should be switched from the second communication module 120 to the first communication module 116. It should be noted that while the call is handed from the first communication module 116 to the second communication module, the connection between the endpoint adapter 136 and the network 132 is maintained and, therefore, the communication session is maintained at the components of the third communication network 132 even while the endpoint adapter performs the handoff from one communication module to another.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   enabling a first communication module of a communication device to communicate with an endpoint adapter, the first communication module communicating with the endpoint adapter via a first communication network that uses a first address to contact the communication device;
   enabling a second communication module of the communication device to communicate with the endpoint adapter, the second communication module communicating with the endpoint adapter via a second communication network that uses a second address to contact the communication device;
   causing the endpoint adapter to present the first and second communication modules as a single communication device to a third communication network;
   wherein the third communication network is an enterprise network core; and
   enabling the endpoint adapter to process a handoff from one of the first and second communication modules to the other of the first and second communication modules, by re-INVITE the third communication network when the communication device is in communication with the third network without benefit of a media server.

2. The method of claim 1, wherein the first communication network comprises at least one of a cellular network and a PSTN.

3. The method of claim 2, wherein the first address corresponds to a telephone number of the communication device.

4. The method of claim 2, wherein the second communication network comprises a data network.

5. The method of claim 4, wherein the second address is at least one of an IP address and SIP address.

6. The method of claim 5, wherein:
   the first communications module is a cellular telephone communications module; and
   wherein the second communication module comprises a web browser.

7. The method of claim 1, wherein the third communication network, further comprises, a plurality of servers and endpoints connected to a common backbone.

8. The method of claim 7, wherein the second communication network is also the enterprise network core.

9. The method of claim 1, further comprising:
   using, by the endpoint adapter, the first communication network to exchange messages during a communication session with the communication device;
   determining, during the communication session, that the communication device has lost connectivity with the endpoint adapter via the first communication network; and
   in response to determining that the communication device has lost connectivity with the endpoint adapter via the first communication network, using, by the endpoint adapter, the second communication network to exchange messages during the communication session with the communication device.

10. A non-transitory computer readable medium having stored thereon instructions that cause a computing system to execute a method, the instructions comprising:
    instructions configured to enable communications with a first communication module of a communication device, the first communication module being contacted via a first communication network that uses a first address to contact the communication device;
    instructions configured to enable communications with a second communication module of the communication device, the second communication module being contacted via a second communication network that uses a second address to contact the communication device;
    instructions configured to present the first and second communication modules as a single communication device to a third communication network;
    wherein the third communication network further comprises an enterprise network core; and
    instructions configured to cause the endpoint adapter to process a handoff from one of the first and second communication modules to the other of the first and second communication modules, by re-INVITE the third communication network when the communication device is in communication with the third network without benefit of a media server.

11. The computer readable medium of claim 10, wherein the first communication network comprises at least one of a cellular network and a PSTN.

12. The computer readable medium of claim 11, wherein the first address is a telephone number of the communication device.

13. The computer readable medium of claim 11, wherein the second communication network comprises a data network.

14. The computer readable medium of claim 13, wherein the second address is at least one of an IP address and SIP address.

15. The computer readable medium of claim 14, wherein the second communication module comprises a web browser.

16. The computer readable medium of claim 10, wherein the third communication network and the second communication network are the same.

17. The computer readable medium of claim 10, further comprising:
    instructions configured to use the first communication network to exchange messages during a communication session with the communication device;
    instructions configured to determine, during the communication session, that the communication device has lost connectivity via the first communication network and in response to determining that the communication device has lost connectivity via the first communication network, use the second communication network to exchange messages during the communication session with the communication device.

18. A communication system, comprising:
    an endpoint adapter configured to communicate with a first communication module of a communication device via a first communication network that uses a first address to contact the communication device, the endpoint adapter further configured to communicate with a second communication module of the communication device via a second communication network that uses a second address to contact the communication device, and the endpoint adapter further configured to present the first and second communication modules as a single communication device to a third communication network; and
    wherein the third communication network further comprises an enterprise network core; and the endpoint adapter configured to process a handoff from one of the first and second communication modules to the other of the first and second communication modules, by re-INVITE the third communication network when the communication device is in communication with the third network without benefit of a media server.

19. The communication system of claim 18, wherein the first communication network comprises at least one of a cellular network and a PSTN and wherein the first address corresponds to a telephone number.

20. The communication system of claim 19, wherein the second communication network comprises a data network and wherein the second address is at least one of an IP address and SIP address.

* * * * *